United States Patent

Hastings et al.

[15] 3,658,084

[45] Apr. 25, 1972

[54] GATE VALVE HAVING RELATIVELY MOVABLE SEAT MEMBERS

[72] Inventors: Reeve R. Hastings, Chagrin Falls; Arthur J. Stock, Lakewood, both of Ohio

[73] Assignee: Stock Equipment Company, Cleveland, Ohio

[22] Filed: Feb. 16, 1970

[21] Appl. No.: 11,698

Related U.S. Application Data

[62] Division of Ser. No. 752,312, Aug. 13, 1968, Pat. No. 3,547,140.

[52] U.S. Cl............................................137/246.22
[51] Int. Cl................................................F16k 3/20
[58] Field of Search............137/237, 240, 241, 246, 246.22; 251/159, 158, 167

[56] References Cited

UNITED STATES PATENTS 3,212,036  10/1965  Skarpaas..........................251/159 X
2,695,155  11/1954  Westling............................251/159
1,683,372  9/1928   Plantinga..........................137/237
2,664,338  12/1953  Cornell.........................137/240 X
2,125,253  7/1938   Bowland...........................251/159
2,316,933  4/1943   Chaplin............................251/159

FOREIGN PATENTS OR APPLICATIONS 674,771  7/1952  Great Britain......................251/159
148,715  5/1950  Australia...........................137/240

Primary Examiner—M. Cary Nelson
Assistant Examiner—Richard Gerard
Attorney—Bosworth, Sessions, Herrstrom & Cain

[57] ABSTRACT

A valve for controlling flow of fluid under pressure having a single gate and a pair of valve seats. Air under pressure is directed against one side of each of the valve seats which are constructed to provide leakage at the valve seats thereby providing flow of air to both the upstream and downstream sides of the valve gate.

4 Claims, 8 Drawing Figures

INVENTORS
REEVE R. HASTINGS
ARTHUR J. STOCK
BY Bosworth, Sessions
Herrstrom & Cain
ATTORNEYS.

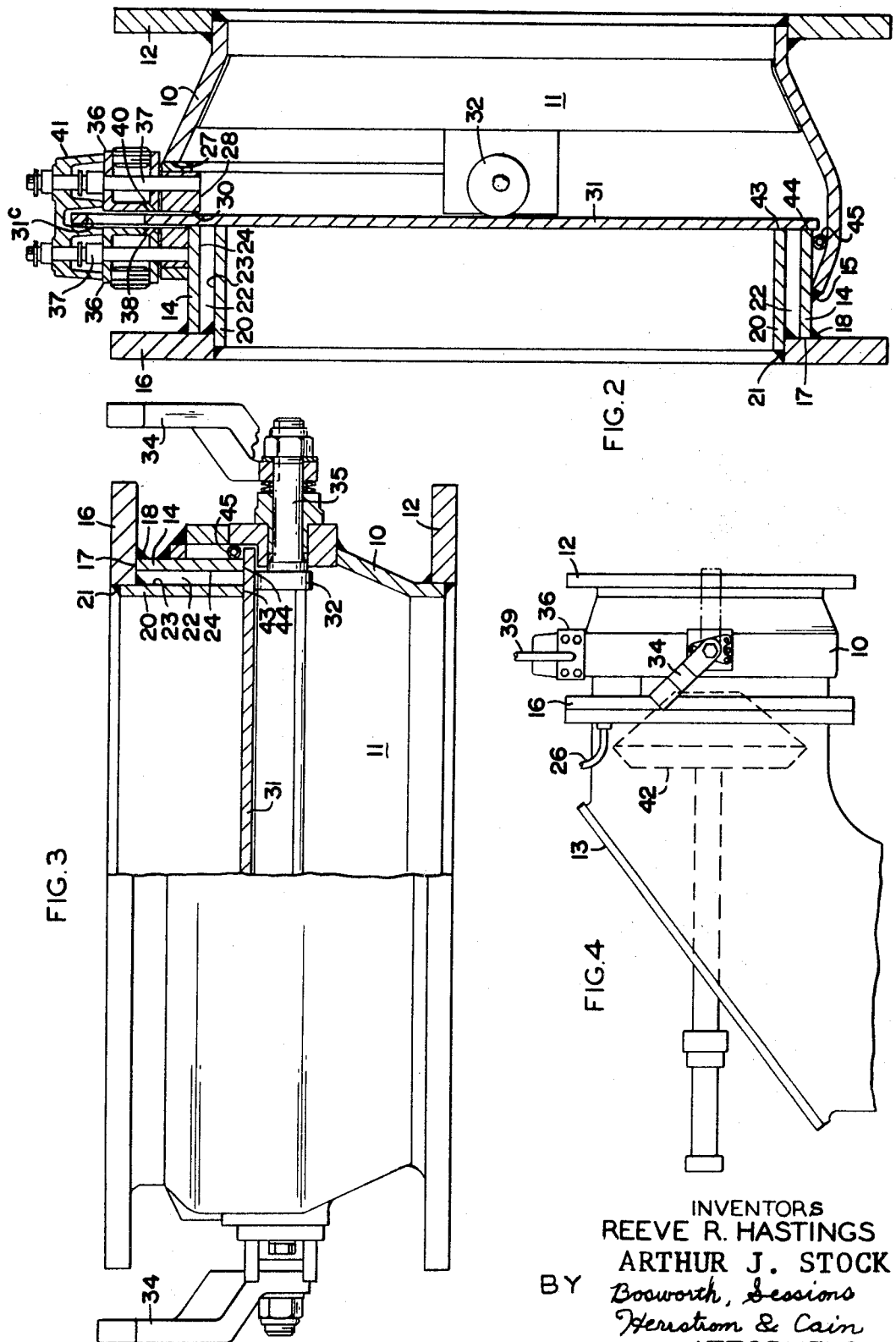

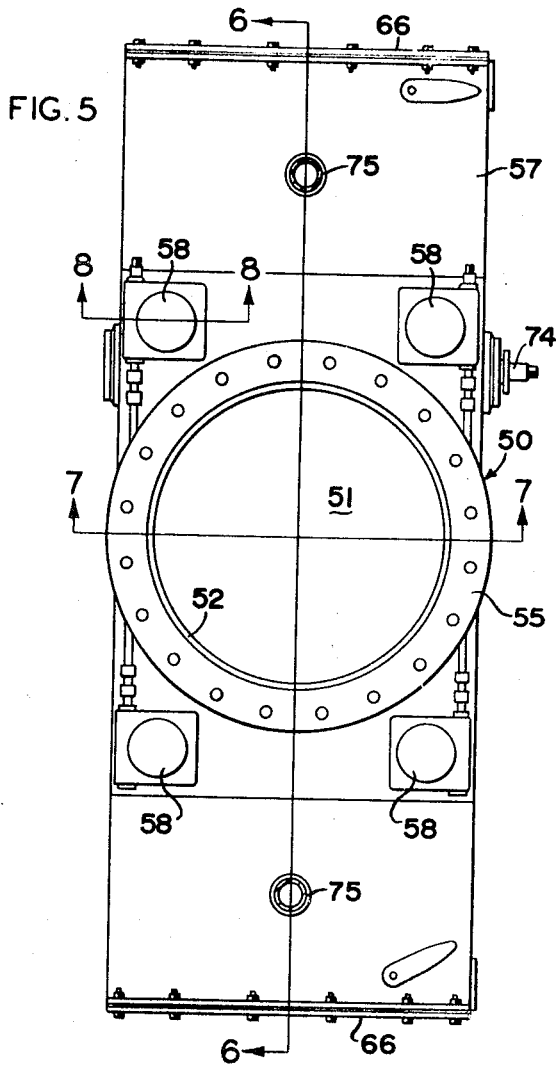
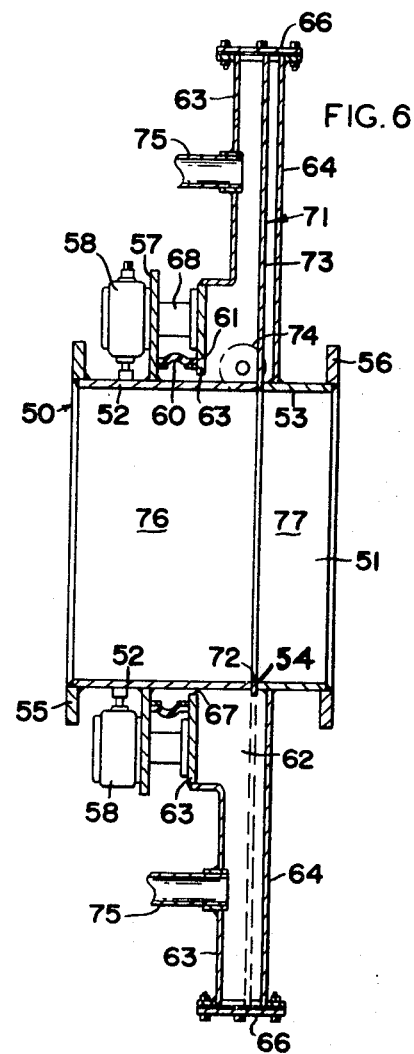
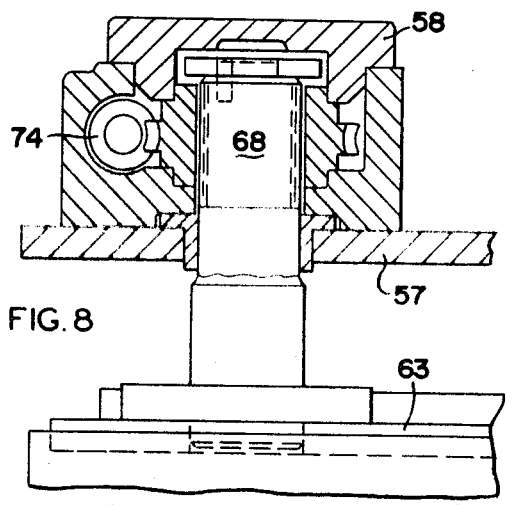
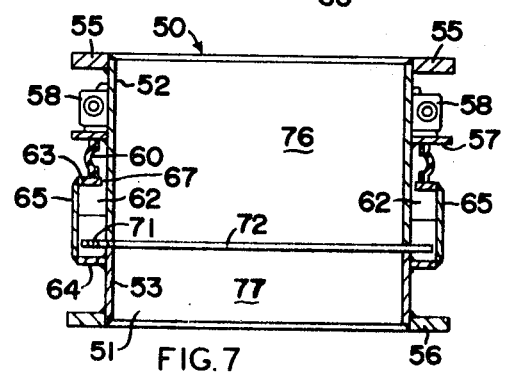

GATE VALVE HAVING RELATIVELY MOVABLE SEAT MEMBERS

CROSS REFERENCE TO RELATED APPLICATION

This application is a division of applicants' copending application Ser. No. 752,312, filed August 13, 1968, now U.S. Pat. No. 3,547,140.

BACKGROUND OF THE INVENTION

This invention relates to a gate valve and more particularly to a single gate valve having two valve seats.

In the control of the flow of fuel such as pulverized coal and air, between a source of fuel, such as a pulverizing mill, and a furnace where the fuel is burned, it may be desirable or necessary to disconnect one fuel supply conduit from the furnace while continuing to operate the furnace with fuel supplied through another conduit. In conventional furnaces the pulverized coal is directed by an air stream against a diffuser cone to control the flame and to prevent damage to the walls of the furnace. After long periods of usage, the surface of the cone is abraded requiring replacement. Access must then be provided to remove and replace the diffuser cones without shut down of the furnace which, for example, may be providing steam for power station generators where a shut down would substantially reduce the power output of the station.

When it becomes necessary to shut down one of the fuel lines to provide access to the diffuser cones, it is imperative that the hot and noxious gases generated in the furnace be prevented from escaping and thereby endangering the personnel working in the vicinity. The gases may be at temperatures in the neighborhood of 3,000° F. and the gases may contain substantial quantities of sulfur dioxide, carbon dioxide and carbon monoxide. It has been proposed that a pair of gate valves be installed in the fuel lines with a source of air under higher pressure than that generated in the furnace between the two valves. When it becomes necessary to replace a cone, the positioning rod to which the cone is attached is retracted through the two valves by suitable mechanism or by hand. After the cone has passed through the valves, the valves are closed and high pressure air is directed into the space between the two closed valves to prevent the escape of gas from the furnace through either of the valves. Such arrangements are expensive because of the duplication of parts and the precise machining that is required on the seats and gates of these valves. In addition, there are normally a large number of fuel lines required, for example, in one installation 54 fuel lines were utilized. Thus, any increase in cost of the valves materially increases the cost of the installation.

SUMMARY OF THE INVENTION

It is, therefore, an object of the present invention to provide a single gate valve of improved construction that will permit ready access to the furnace and at the same time will prevent the escape of hot noxious gases through the valve. A further object of this invention is to provide a single gate valve having two valve seats and in which air under low pressure is introduced between the two valve seats. Another object of this invention is to provide an improved single gate valve of simple and inexpensive construction for providing ready access to the furnace through the burner line.

The valve contemplated by this invention comprises a pair of annular valve seat members extending into close proximity to an opening in the side wall of the valve body. A flat gate plate is inserted through the opening into contact with the valve seat members and sealing air is introduced into the valve body in the vicinity of the juncture of the gate plate and valve seat members. The seal between the gate and the valve seat may be an imperfect seal because the gate and the valve seat members are not necessarily gas-tight machined since the air will be caused to flow past one of the valve seats in the upstream direction and around the other valve seat in the downstream direction. The gate member may be manually or mechanically positioned in the valve body. If the gate is manually operated, a gate cover is provided which includes air conduits adapted to direct high pressure streams of air into the opening through which the gate is to be inserted when the cover has been removed. After the gate has been properly positioned, it is held in place by suitable cam means and the gate cover is then replaced and the high pressure air is turned off and the sealing air is turned on.

BRIEF DESCRIPTION OF THE DRAWINGS

In the drawings:

FIG. 2 is a cross sectional view taken along the line 2—2 of FIG. 1;

FIG. 3 is a partial cross sectional view taken along the line 3—3 of FIG. 1;

FIG. 4 is a side elevational view of the valve of this invention showing its connection to a burner line elbow;

FIG. 5 is a top plan view of another embodiment of the valve of this invention;

FIG. 6 is a cross sectional view taken along the line 6—6 of FIG. 5;

FIG. 7 is a cross sectional view taken along the line 7—7 of FIG. 5, and

FIG. 8 is a partial cross sectional view taken along the line 8—8 of FIG. 5.

DETAILED DESCRIPTION OF PREFERRED EMBODIMENTS

Figure 1:
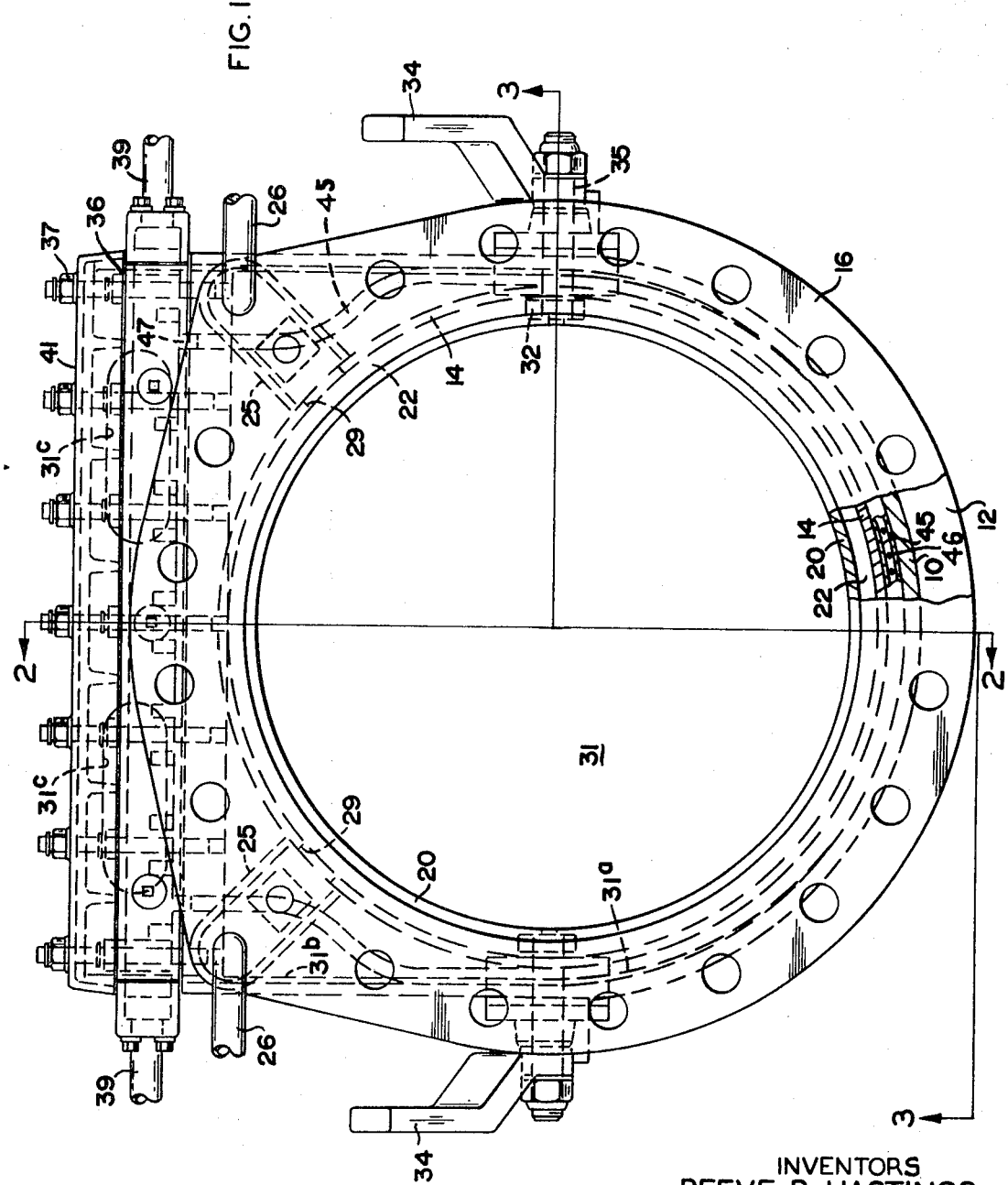
FIG. 1 is an elevational view of the single gate valve of this invention.

As shown in FIGS. 1 thru 4, one embodiment of the valve of this invention comprises a valve body 10 having a passage 11 therethrough for the flow of pulverized coal and air or other fluids. A flange 12 at one end of the valve body is adapted for conventional attachment to the burner pipe. A valve seat member 14 is rigidly secured, as by welding at 15, to the other end of the valve body 10. The valve seat member 14 is a cylindrical body extending into the passage 11 and having a flange 16 secured to the outer end 17 as by welding at 18 for conventional attachment to a burner line elbow 13 as shown in FIG. 4. A second valve seat member 20 is affixed to the inner edge of the flange 16 as at 21. The valve seat member 20 is also cylindrical in configuration and of a smaller external diameter than the internal diameter of the valve seat member 14. It is coaxial with the valve seat member 14 thereby providing an annular air passage 22 between the outer periphery 23 of valve seat member 20 and the inner periphery 24 of valve seat member 14.

In order to supply sealing air to the valve, the air passage 22 is in open communication, as at 29, with a pair of air supply members 25 connected to air supply conduits 26 as shown in FIG. 1. Low pressure air on the order of 2 to 3 pounds per square inch is supplied to conduits 26 from a suitable source (not shown). The pressure of the sealing air must be higher than that generated in the furnace which is less than about 1 pound per square inch and usually about a half pound.

One side of the valve body 10 is provided with a longitudinal opening 27 to receive a spacer 28 which spacer is rigidly secured to the valve body 10 and to the outer valve seat member 14 in air tight relationship. The spacer 28 is provided with a transverse opening 30 adapted to receive a gate 31. The major axes of the openings 27 and 30 are normal to the axis of the passageway 11.

The gate 31 is a flat plate adapted to be inserted into the valve body 10 through the opening 30 to block the passage 11 by being forced against the valve seat members 14 and 20 by a pair of cams 32. Substantially the lower half 31a is semicircular in configuration and the upper half 31b is rectangular. The upper half 31b is provided with openings 31c to provide means for removal of the gate from the valve. The cams are rotated into position by levers 34 through suitable connections 35 as shown in FIG. 3. When rotated by the levers 34, the cams bear against the side of the gate 31 opposite the side in contact with the inner extremities of the valve seat members 14 and 20. The cams, gate plate and valve seat members do not have to be constructed to provide a perfect seal which is air tight. Thus, the gate plate and valve seat members are not necessarily precision machined as is normally required to provide an air tight seal.

When the opening 30 is opened to the atmosphere for insertion or removal of the gate 31, the escape of hot, noxious gases from the furnace should be prevented. To accomplish this an air manifold 36 is positioned on both sides of the opening 30 in the spacer 28 and secured to the spacer 28 by a plurality of nut and bolt assemblies 37. That portion of the air manifold 36 on one side of the opening 23 is provided with a plurality of ports 38 which direct air from the air manifold 36 downwardly and inwardly toward the opening 30. The other portion of the air manifold 36 on the other side of the opening 30 is also provided with a plurality of ports 40 which direct the air downwardly and inwardly toward the opening 30. Air under substantial pressure, for example, on the order of 25 to 120 pounds per square inch is supplied to the air manifold 36 by supply conduits 41 from a suitable source (not shown). To seal the opening after insertion or removal of the gate 31 a gate cover 41 is secured to the air manifold 36 by the nut and bolt assemblies 37 and completely covers the opening 30.

If desired and to insure that any coal dust or other finely divided matter is removed from the area around the valve seat 44 and between the valve body 10 and the valve seat member 14, an annular air conduit 45 may be provided. Conduit 45 encircles substantially all of the periphery of the valve seat member 14 and is located very near the valve seat 44. The conduit 45 is provided with a plurality of ports 46 (see FIG. 1) to direct the air between the valve seat member 14 and the valve body 10. Air from a suitable source such as the air manifold 36 to which the air conduit 45 is connected, as at 47, will ensure that any coal dust or other finely divided matter will be blown away from the area of the valve seat 44 before the gate 31 is inserted into the valve body 10.

The valve of this invention is normally positioned adjacent a furnace (not shown) by bolting the flange 12 to an opening in the mating portion of the burner pipe and the flange 16 is bolted or otherwise secured to the elbow 13. If it is desired to remove a diffuser cone as shown in the dotted lines at 42 in FIG. 4, or to shut off flow through the valve, the following operations take place. The diffuser cone 42 is retracted by suitable conventional means (not shown) through the valve into the elbow 13. The air supplied to conduits 45 and air manifold 36 is turned on to direct the air through the air manifold and outwardly through the ports 38 and 40 into the opening 30 in the spacer 28. The pressure is sufficient to insure that the flow of air will be toward the valve passage 11 and thereby prevent the escape of noxious gases through the opening 30. The gate cover 41 is removed and the gate 31 is dropped into place as shown in FIG. 2. The levers 34 are moved to rotate the two cams 32 to force the gate 31 into contact with the valve seat members 14 and 20. The gate cover 41 is replaced and the air to conduits 45 is discontinued. The low pressure air to conduits 26 is turned on, thereby directing a stream of air into the two air supply members 25 and into the air passage 22. Because of the imperfect seal between the valve seat members and the gate, the air in passage 22 will escape around the annular valve seat 44 formed by the valve seat member 14 and the gate 31 and will be directed downstream of the valve thereby preventing any gases between the valve 10 and the furnace from escaping past the gate 31. The air in the passage 22 will also escape past the annular valve seat 43 formed by the valve seat member 20 and gate 31. The air will thus be directed upstream toward the elbow 13 and serve to cool the gate 31 and surrounding area to permit the opening of the elbow 13 and removal of the diffuser cone 42 for replacement.

To re-establish flow through the valve all that is required is a reversal of the above described procedure. In the event that the conduit 45 is not needed to remove coal dust, the quantity of the high pressure air to the manifold 36 may be substantially reduced because the high pressure air will not be required to clean out the valve body area near the valve seat member 14. In such event the air need only prevent the escape of gas through the opening 30 during insertion and removal of the gate 31.

Referring now to FIGS. 5 thru 8, an alternative embodiment of the valve of this invention is shown. The valve comprises a valve body 50 having a flow passage 51 therethrough for the flow of pulverized coal and air or other fluids. The valve body 50 comprises two annular valve seat members 52 and 53 axially aligned but spaced from each other to provide therebetween an opening 54 in a plane normal to the axis of the flow passage 51. A flange 55 for attaching the valve to a burner line (not shown) is secured as by welding to the end of valve seat member 52 opposite opening 54. A flange 56 is secured to the end of the valve seat member 53 opposite the opening 54 and is utilized to affix the valve to the mating portion of a burner pipe. A rectangular support flange 57 is secured to the outer periphery of the valve seat member 52 intermediate the flange 55 and the opening 54. The support flange 57 carries at each of its four corners a jack screw and worm gear assembly 58, the function of which will be hereinafter explained.

To assist in maintaining an air tight area around the valve seat member 52, a flexible annular sealing member 60 is secured to the underside of the support flange and completely encircles and is spaced from the outer periphery of the valve seat member 52. The end 61 of the sealing member 60 remote from the support flange 57 is secured to an air chamber 62. The air chamber 62 is of substantially rectangular box-like construction and surrounds the opening 54 between the two valve seat members 52 and 53. The air chamber 62 comprises a top plate member 63, a bottom plate 64, a pair of side walls joining the top and bottom plates 63 and 64 and a pair of end walls 66 bolted or otherwise secured to the top and bottom plates 63 and 64.

The top plate 63 is provided with an annular opening 67 of a diameter slightly larger than the diameter of the outer periphery of the valve seat member 52 and is secured to the sealing member 60 and the jack screw 68 of the worm gear and jack screw assembly 58. The bottom plate 64 is secured in air tight relationship to the outer periphery of the valve seat member 53 as by welding. Thus the air chamber 62 is rigidly secured to the valve seat member 53 but is spaced from the valve seat member 52 and encircles the opening 54 between the two valve seat members to provide an area around the opening 54 that is isolated from the atmosphere. Air is supplied to the air chamber 62 through air supply conduits 75 which are located on opposite sides of the valve body 50 in the top plate 63.

To substantially shut off flow through the valve a substantially flat rectangularly shaped gate plate 71 is movably positioned within the air chamber 62 and the valve body 50. The gate plate 71 is provided with an opening 72 having a diameter substantially identical to the internal diameter of the valve seat members 52 and 53 to provide a smooth flow passage 51 through the entire valve body 50. To close the flow passage 51, the gate plate 71 is moved by conventional driving mechanism 74 from its position shown in full lines in FIG. 6 with the opening 72 aligned with the flow passage to the dotted line position shown in FIG. 6, wherein the solid portion 73 of the gate plate 71 is aligned with the flow passage 51, thereby substantially closing the flow passage. If desired, the gate plate opening 72 may be eliminated by reducing the gate plate to a length that will not block the flow passage 51 when the gate plate is withdrawn into the air chamber 62.

In operating this valve the flow of fuel is through the valve with the gate plate 71 in the position shown in full lines in FIG. 6. If it is desired to close the valve, the four jack screws and worm gear assemblies 58 are actuated manually or by suitable motors (not shown) to drive the jack screws 68 in the direction of the air chamber 62 which applies pressure to the top plate 63 and subsequently to the bottom plate 64 secured to the lower valve seat member 53 forcing the same away from the gate plate 71 thereby permitting movement of the gate plate. The driving mechanism 74 is actuated to move the gate plate 71 to the dotted line position shown in FIG. 6 and after movement of the gate plate to the dotted line position, the solid portion 73 is now aligned with the flow passage 51, thereby shutting off the flow of fuel-air mixture through the valve 50. The jack screws 68 are retracted thereby bringing the valve seat members 52 and 53 into engagement with the gate plate 71. The seal between these two valve seat members and the gate plate is an imperfect seal in order that air supplied to the air chamber 62 through the two air supply conduits 75 will leak past the juncture between the gate and valve seat members in the upstream direction 76 and in the downstream direction 77 thereby insuring that any noxious gases from the downstream side of the valve are prevented from leaking past the gate and that the plate is cooled. To open the valve, the above procedure is reversed.

It can be seen from the foregoing that by permitting leakage of air through the two valve seats formed by a single gate the noxious and hot gases are prevented from escaping past the valve and, at the same time, a cooled atmosphere is provided for the workmen repairing or replacing the furnace components. It can also be seen from the foregoing that this valve is simple in construction and operation with few parts that require maintenance because the valve seat members and gate do not require precise machining since a perfect gas-tight seal is not required. It can also be seen from the foregoing that various modifications may be made in this invention without departing from the spirit and scope of the appended claims.

We claim:

1. A valve comprising a valve body having a flow passage therethrough subject to the presence therein of fluid at superatmospheric pressure; a pair of valve seat members surrounding said passage and defining between them an opening extending transversely of said passage; a reciprocating closure member having two sides and adapted to be moved transversely of said passage between a closed position in which it is disposed in said transverse opening between said valve seat members to close said passage and an open position in which it opens said passage; means for causing relative movement between said valve seat members to increase and decrease the width of said transverse opening to cause said seat members to press in imperfect fluid seal relationship against said closure member to form a juncture between each side of said closure member and the valve seat member at said side when said closure member is in its closed position, and to release said closure member when it is to be in its open position; enclosure means enclosing in gas-tight relation from the atmosphere the closure member and the junctures between said valve seat members and said closure member in its closed position, said enclosure means providing access of gas in said enclosure means to each entire juncture between each of said valve seat members and said closure member when said closure member is in its closed position, said enclosure means having a wall on each side of said closure member, each of said walls being connected to one of said valve seat members, the wall that is connected to one of said seat members having a flexible annular sealing member that permits relative movement between said one valve seat member and said enclosure means when there is relative movement between said seat members, said flexible portion also acting as part of said enclosure means to enclose the interior of the enclosure means for the atmosphere; means for maintaining in said enclosure means gas at a pressure in excess of the pressure of the fluid in said passage while said closure member is in its closed position to insure that any leakage of fluid through said junctures between said closure member and said seat members will be gas from said enclosure means into said passage, to prevent escape of fluid from said passage through either of said junctures when said closure member is in its closed position; means for reciprocably moving said closure member in said enclosure means between its open and closed positions; and mechanical means operating independently of said flexible annular sealing member at spaced locations surrounding said flexible annular sealing member and between said enclosure means wall and said one valve seat member connected to said flexible annular sealing member, for positively causing relative movement between said enclosure means and said one valve seat member.

2. A valve according to claim 1 wherein said enclosure means extends transversely of said passage and extends entirely around both said valve seat members, said closure member being adapted to move in said enclosure means between its open and closed positions, and in which said enclosure means is rigidly fixed to the other of said valve seat members.

3. A valve according to claim 1 wherein said flexible annular sealing member extends around said one seat member.

4. A valve according to claim 1 wherein said mechanical means at spaced locations includes a jack screw and worm assembly adapted to engage said wall of the enclosure means having said annular sealing member.

* * * * *